United States Patent Office 3,822,226
Patented July 2, 1974

3,822,226
CURABLE POLYISOCYANATE AND PHENOLIC ADDITION PRODUCTS AND PROCESS FOR CURING WITH TERTIARY AMINE
David D. Taft and Roger A. Schmidt, Columbus, Ohio, assignors to Ashland Oil Inc., Ashland, Ky.
No Drawing. Filed May 4, 1972, Ser. No. 250,121
Int. Cl. C08g 22/08
U.S. Cl. 260—18 TN
24 Claims

ABSTRACT OF THE DISCLOSURE

Novel low cost compositions suitable for a number of coating, filling, binder, and other applications and process for preparing same comprising mixing a polyisocyanate and phenolic addition product formed by reacting phenolic compounds with certain unsaturated materials and then curing the mixture rapidly at room temperature in the presence of a tertiary amine to crosslink the materials.

BACKGROUND OF THE INVENTION

It has been known, heretofore, that isocyanates react with phenolic-type resins to result in crosslinked materials. Heating has been generally employed to cause the isocyanate to react with the phenolic resin, either through the phenolic hydroxy group or through the methylol group in order to achieve the formation of urethane crosslinkages. It has been known also to react isocyanates with polyepoxides and polyesters to result in crosslinked materials, or in chain-extended materials that can subsequently be cross-linked with excess isocyanates. These reactions also frequently require heating to effect the desired crosslinking. There have also been disclosed in the prior art certain coating compositions formed from polyisocyanate-resin mixtures which can be crosslinked or cured at room temperature. Of those prior art compositions that can be cured at room temperature, unusually long curing times are required.

It has further been known, heretofore, in the prior art that it is possible to prepare coating compositions from a number of unsaturated materials and polyisocyanates. Such prior art is exemplified by the following U.S. Pats.: 2,965,615; 2,968,647; 3,036,045; 3,057,614; 3,110,699; 3,258,450.

While these and other efforts have led to significant advancement in the coating art, there are still deficiencies in the prior art yet to be overcome in developing compositions suitable for a variety of coating, binder, and other applications which can be formed quickly and with a minimum of time and expense.

The present invention relates to the production of such compositions. Furthermore, this invention relates to the rapid and efficient curing of such compositions, which are a combination of a phenolic functional material and a polyisocyanate, in the presence of a tertiary amine. Specifically, this invention relates to improvements in such a system enabling its use in diversified coating, binder, and other applications.

In the coating art, for example, typically, a coating composition is prepared in an organic or aqueous solvent; is applied to a surface; and the solvent is allowed to evaporate. Normally the composition required heating and/or prolonged air drying in order to cure or harden the coated surface by solvent evaporation, oxidative curing or chemical curing. A variety of such coating systems such as varnishes and baking alkyds are known. Reduction in the period of time required to cure coatings and elimination of a heat treatment, particularly where the materials to be coated are heat sensitive, is particularly desirable.

Curable compositions based on polyisocyanates and a variety of active hydrogen containing materials such as phenolic resins are known. The problems encountered when adapting such systems to various coating, binder, and other applications include those mentioned above; namely, that heating or curing for extended periods of time is required to give a properly cured and useful coating. On the other hand, where the system is catalyzed for a quick cure, problems arise with respect to, among others, the pot life of the composition.

In U.S. Pat. 3,409,579, issued Nov. 5, 1968, there are disclosed certain polyisocyanate-phenolic resin compositions which can be cured with amines and which may be useful as coatings. It has now been found that certain of the combinations of polyisocyanate and penolic resin compositions, useful as binders for foundry core applications by virtue of their superior adhesion and tensile strength when applied to sand and the like, are not entirely suitable for certain coating as well as other applications because their color and color retention properties, flexibility and caustic resistance are not suitable for applications where flexibility, durability, and resistance are highly desirable properties. The problems noted with many polyisocyanate-phenolic combinations is that initially the color of the composition is lightly off-white to signifiicantly yellow and that the color characteristics are affected by aging, particularly under ultraviolet light conditions. Furthermore, these systems have inferior durability over extended periods of time. Foundry cores are used a relatively short time after their formation and, after use, are immediately broken up for later re-use. Such is not the case in applications intended for use over long periods of time. Such combinations would not be suitable in applications where clear and colorless coatings, for example, are desired or where the coatings are pigmented with a white or other light colored pigment and whose appearance would be adversely affected by the initial yellowing or the yellowing upon aging of the binder or vehicle. Also, pot life of the compositions, although adequate for foundry applications, is not entirely satisfactory for coating applications.

More specifically, in U.S. Pat. 3,409,579, it is disclosed that certain phenolic resin-polyisocyanate mixture may be used as coating compositions and cured at room temperature. The preferred phenolic resins are condensation products of a phenol having the general formula:

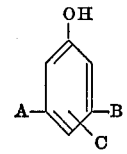

wherein A, B, and C are hydrogen, hydrocarbon radicals, oxyhydrocarbon radicals, or halogen. The condensation product of a phenol of the aforementioned structure with an aldehyde having the general formula R'CHO wherein R' is a hydrogen or a hydrocarbon radical of 1 to 8 carbon atoms, is prepared in the liquid phase under substantially anhydrous conditions at temperatures below about 130° C. in the presence of catalytic concentrations of a metal ion dissolved in the reaction medium. The preparation and characterization of these resins is disclosed in greater detail in U.S. Pat. 3,485,797, issued Dec. 23, 1969. These resins have the general formula:

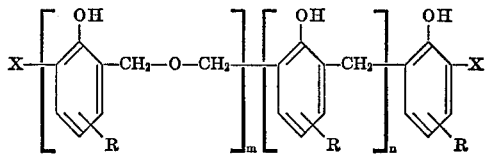

wherein R is a hydrogen or a phenolic substituent meta to the phenolic hydroxyl group, the sum of m and n is at least 2 and the ratio of m-to-n is at least 1, and X is an end-group from the group consisting of hydrogen and methylol group, the molar ratio of said methylol-to-hydrogen end-groups being at least 1.

In such a phenolic resin structure or in other phenolic resins which can be employed in the above patent, a high crosslink density is achieved on curing with a polyisocyanate. This often leads to excesssive solvent entrapment during curing or inflexible films once curing has occurred. Furthermore, because of the close proximity of the phenolic groups in the composition disclosed in the above patent, some of the groups are left unreacted after curing. These phenolic groups are subject to ionization in the presence of an alkali or caustic and as a result are more susceptible to caustic degradation. For many coatings as well as other applications where a high degree of flexibility and resistance is desired in the cured product, the use of such phenolic resins cured with polyisocyanates is not desirable. Also, these phenolic resin compositions on exposure to ultraviolet light and other weathering conditions often degrade leading to excessive chalking and yellowing of the coating. This is true of the known and conventional phenolic resins such as the novolaks, resoles, resitoles, and resites, generally, when cured with polyisocyanate in the presence of a tertiary amine.

For the most part, the aforementioned polyisocyanate and phenolic resin combinations have inadequate solvent and caustic resistance for some coating, or other applications where such resistance is a highly desirable property. Moreover, these prior art materials have poor flexibility when the composition, as applied, must exhibit flexibility in its ultimate use (such as coatings or flexible binders). The foregoing comments in regard to the compositions of the named patents does not, of course, mean that they are not entirely suitable for some applications and in respect thereto represent advancements over compositions preceding them in the art.

It has been discovered in the instant invention that many of the foregoing and other problems in the prior art can be overcome by preparing phenolic addition products, mixing the resulting material with a polyisocyanate and curing the mixture in the presence of a tertiary amine. The compositions of the instant invention have improved flexibility over the conventional phenolic resins of the prior art as exemplified by U.S. Pat. 3,409,579. The weathering characteristics of these conventional materials are also improved by the novel composition and process of the instant invention. The instant process is further characterized by less solvent entrapment when coated on a substrate in solvent solution. In some cases, higher solids application systems are achieved by using the compositions described in the instant invention as compared to those compositions of U.S. Pat. 3,409,579.

Thus the compositions of the present invention, while they do not entirely eliminate the problem of yellowing inherent in some phenolic resins, they are more resistant to degradation by ultraviolet light. In addition, these compositions show greater flexibillity in use than those produced from the reaction of phenolic resins and polyisocyanate as described in the above patent. In addition, the compositions of the present invention are easily and rapidly cured at room temperature.

Thus, this invention makes it possible to provide compositions which are flexible and which rapidly cure to give durable weathering properties. The compositions of this invention also exhibit improved resistance to caustics, etc., thus overcoming a number of deficiencies in the compositions of the prior art. These compositions can be coated, for example, on a variety of substrates such as paper, textiles, metal, glass, and wood in typical coating applications to give superior rapid-cure coatings.

OBJECTS OF THE INVENTION

Thus, it is an object of the present invention to provide improved quality multi-purpose compositions and a method for curing such compositions.

It is an additional object of the present invention to provide novel compositions which are rapidly curable to essentially their final state at room temperature and which have good pot life.

It is another object of the present invention to provide coating and binder compositions of improved weathering characteristics which are suitable for, among other uses, paints, varnishes and fillers.

Still another object of the present invention is to provide improved compositions having excellent moisture resistance, caustic resistance, improved weatherability, improved flexibility and good adhesion to a variety of substrates.

A further object of the present invention is to provide a novel process for curing the improved compositions without the application of heat.

Still other objects of the present invention will become apparent from the description of the invention and the claims that follow.

DESCRIPTION OF THE INVENTION

Broadly, the present invention relates to compositions comprising phenolic addition resins which have been combined with sufficient polyisocynate to crosslink the phenolic addition resin. The compositions are intended in one embodiment of the invention, to be coated on a substrate and cured with a tertiary amine.

According to the present invention, coating compositions are provided which cure at room temperature. Coating compositions of the present invention are generally made available as a composition comprising a phenolic addition resin component and a polyisocyanate component. These compositions can be stabilized optionally with acid or the like and may contain, optionally, an appropriate amount of organic solvent and other additives such as pigments, plasticizers, etc. At the time of use, the composition is applied by conventional means, i.e., brushing, spraying, rolling, and is brought together with a tertiary amine. In a brief period of time, within seconds or minutes, the product of this invention has cured to a desired state more rapidly than the prior art and/or exhibits improved properties over the prior art. When used as a coating composition, the product of this invention cures to a tack-free state within seconds or minutes and is hard enough to withstand handling without deformation or smearing of the coating. Furthermore, when so applied, products coated with the novel compositions of this invention and cured according to the method of this invention are durable enough to withstand the handling required for boxing, shipping, etc. within anywhere from about 10 minutes (though usually slightly longer) to 4 hours. This time for safe handling is determined by the exact component makeup of the composition and the type of film properties desired in the ultimate coated product. In many cases the compositions of this invention, when applied as coatings, exhibit about 50 to about 65% of their final film properties in about 30 to 45 minutes and in some cases in even shorter times after exposure to a tertiary amine for 15 seconds.

The term "phenol addition product" as employed herein is meant to define products obtained by reacting a phenol with an unsaturated material selected from the group consisting of (1) the unsaturated aliphatic acids having from about 12 to about 22 carbon atoms; (2) natural oils which are glycerol esters of the acids contemplated by (1); (3) synthetic esters of the acids contemplated by (1) with monohydric and polyhydric alcohols, preferably saturated alcohols of about 1 to 22 carbon atoms, and more preferably of about 1 to 8 carbon atoms; (4) unsaturated aliphatic alcohols containing from about 12 to about 22 carbon atoms per molecule; (5) homopolymers of butadienes; and (6) copolymers of butadiene and its homologues with vinyl unsaturated monomeric materials; (7) synthetic esters of the alcohols contemplated by (4) with monobasic and polybasic acids of about 1 to 36 carbon atoms, preferably saturated or aromatic of about 1 to 12 carbon atoms of which 6 carbons are in the ring when it is aromatic.

The term "phenol" or "phenolic" is intended, generally, to include phenol or substituted phenols. Suitable phenols are those of the following general formula:

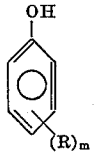

wherein R can be H, a $C_1$–$C_9$ aliphatic substituent saturated or unsaturated, branched or unbranched, or an aromatic substituent of which 6 carbon atoms are in the ring, $m$ is an integer of from 1 through 4 and preferably is 1 or 2. It is preferred that the phenol not be substituted or at least not in both the ortho and para positions. The more ortho and/or para positions that remain free from substitution the better the reaction between the phenol and the unsaturated material. Specific illustrative substituted phenols which can be used in place of phenol are meta- or para-cresol, para-tertiary-butyl phenol, nonyl phenol, bisphenol A, and o-phenyl phenol to name only a few.

Illustrative unsaturated aliphatic acids of category (1) having from 12 through 22 carbon atoms per molecule contemplated by the invention are palmitoleic, oleic, linoleic, linolenic, licanic, eleostearic, clupanodonic, erucic, and arachiodonic acids.

Illustrative examples of natural oils contemplated in category (2) include cod liver, corn, cottonseed, herring, kapok, lark, linseed, menhaden, mustard, neat's foot, oiticica, olive, palm, peanut, perilla, poppyseed, rapeseed, rice bran, safflower, salmon, sardine, sesame, shark-liver, soyabean, sunflower, tall, tung, and whale oils.

In category (3) the invention contemplates all of the various aliphatic monohydric and polyhydric alcohol esters of the acids of category (1) of the carbon range previously defined, inasmuch as the specified unsaturation of the ester molecule, rather than the specific alcohol from which the ester is derived, is the essential feature upon which utility of the esters in the invention depends. Thus, the alcohols can be primary, secondary, or tertiary monohydric or polyhydric alcohols. The preferred alcohols are primary alcohols of 1 to about 12 carbon atoms. Representative alcohols are methanol, ethanol, 1-propanol, 1-butanol, 1-pentanol, 1-hexanol, 1-octanol, 1-nonanol, 1-decanol, 1-hendecanol, 1-dodecanol, 1-tridecanol, 1-tetradecanol, 1-pentadecanol, 1-hexadecanol, 1-heptadecanol, 1 - octadecanol, 1 - nonadecanol, 1 - eicosanol, 1-heneicosanol, 1-docosanol, ethylene glycol, propylene glycol, trimethylol propane, trimethylol ethane, neopentyl glycol, polyethylene glycol, pentaerythritol, and the various isomers and unsaturated analogues thereof.

In category (4) the invention embraces without limitation all unsaturated aliphatic alcohols containing at least two double bonds per molecule and from about 12 to about 22 carbon atoms per molecule as starting materials for the production of hydroxyphenylated compounds. Preferred alcohols are prepared by the selective catalytic reduction of the various vegetable oils, which are glycerides of 12 to 22 carbon atoms unsaturated fatty acids. Typical unsaturated alcohols are those obtained by converting to alcohol groups the carboxyl groups of isomeric linoleic, eleostearic, erucic, arachidoinic, and clupanodonic acids and converting both the carboxyl and ketone groups of licanic acid to alcohol groups using selective hydrogenation methods which leave the olefin group unaffected.

Representative butadiene polymers and copolymers of categories (5) and (6) which are used to experimentally illustrate the preparation of hydroxy-phenylated-phenyl-etherated butadiene polymers used in combination with the phenol addition products of unsaturated oils and polyepoxides are listed as follows:

(a) Squalene—a natural polymer of isoprene (hexaisoprene) obtained as an extract from fish oils.

(b) Buton 100 (formerly referred to as C-Oil and MD420)—Sold under the foregoing trademark by Enjay Company, Inc., is described as a copolymer of butadiene and styrene having a molecular weight in the range of 8,000 to 10,000, an iodine value of approximately 300, and a composition of approximately 80 parts butadiene and 20 parts styrene. The butadiene content is described as composed of approximately 40% 1,4-addition and 60% 1,2-addition, Buton 100 has a specific gravity of 0.915 at 25° C. and a viscosity of about 10 poises as a 90% solution in toluene. A similar product is now available from The Richardson Company.

(c) Butarez (a trademark of Phillips Petroleum Co.) represents liquid butadiene polymers composed of approximately 55–65% 1,2-addition and 35–40% of 1,4-addition units. There is in these polymers an average of 0.8 double bond per C4 unit giving iodine values of 375 to 400. Butarez 5 has a viscosity of 36–37 poises at 25° C. and 5.5 poises as a 90% solution in toluene at 25° C. Butarez W has a molecular weight of around 1,800; a viscosity of 98–100 poises at 25° C. and viscosity of 12–13 poises as a 90% solution in toluene at 25° C.

(d) Naugapol 1022 (a trademark of Naugatuck Chemical Division of United States Rubber Company)—a synthetic rubber copolymer of butadiene and styrene.

(e) Shell Isoprene Rubber (Shell Chemical Corp.)—described as possessing physical properties which approximate those of natural Hevea rubber. Chemically, it is a stereospecific isoprene polymer—an essentially cis-1,4-polyisoprene.

Butadiene polymers readily react with phenols to give the new phenol addition products when proper catalysts are used. Convenient catalysts for the preparation of the phenol addition products of butadiene polymers were found to include boron trifluoride, aluminum chloride and aluminum phenoxide. Using $BF_3$ it was found to be convenient to carry out the reaction of the unsaturated polymer with phenol in the temperature range of 25–250° C. The temperature and reaction time vary with the particular combination of phenol and polymer used as well as the final properties desired in the phenol addition product. The reaction of the phenol with the unsaturated material to produce the phenol addition products contemplated for use in this invention is generally performed by heating the reactants, usually in a solvent, to a temperature of from about 120° C. to about 260° C. and preferably from about 140° C. to about 205° C. The reaction is normally conducted under a nitrogen blanket.

The preferred unsaturated compounds are the natural oils of category (2) and tung oil in particular. Also included in the preferred group are the alkyds of category (2). By alkyds is meant the esters of saturated dicarboxylic acids usually of 2 to 18 carbon atoms such as oxalic acid, adipic acid, sebacic acid, octadecanedioic acids, and saturated polyhydric alcohols such as ethylene glycol, propylene glycol, trimethylol propane, pentaerythritol, 1,6-dihydroxyhexane and 1,12 - dihydroxydodecane, as those skilled in the art know.

Typical examples of the phenol addition product are the reaction products of phenol with polybutadiene polymers, such as Buton 100 and Isoprene polymers; linseed oil; tung oil; corn oil; methyl oleate; methyl linoleate; and octadecadienyl alcohol. The preparation of the contemplated phenolic addition products is described in more detail in U.S. Pat. 3,057,614 to Greenlee.

The phenolic addition product component of the binder composition is generally employed as a solution in an organic solvent. The nature and the effect of the solvent will be more specifically described below. The amount of solvent used should be sufficient to result in a composition permitting uniform coating thereof and uniform reaction of the mixture. The specific solvent concentrations for the phenolic addition resins will vary depending on the type of addition resin employed and its molecular weight. In general, the solvent concentration will be in the range of up to 80% by weight of the resin solution and preferably in the range of 20 to 80%.

The phenolic addition product is one component of the novel composition of this invention. The other component is a hardener component comprising a polyisocyanate. The polyisocyanate can be an aliphatic, cycloaliphatic, or aromatic polyisocyanate having preferably 2–5 isocyanate groups; or a polyisocyanurate made thereof. If desired, mixtures of polyisocyanates can be employed. Also contemplated for use in this invention are isocyanate prepolymers formed by reacting, in equivalent excess, any of the above polyisocyanates with a polyhydroxy material such as a polyhydric alcohol, polyoxyalkylene-containing polyols, polyesters (i.e. adipic acid-propylene glycol-trimethylol propane polyester), and the like. Thus, a prepolymer of toluene diisocyanate and ethylene glycol or trimethylol propane can be successfully employed in this invention. Suitable polyisocyanates include the aliphatic polyisocyanates such as hexamethylene diisocyanate, alicyclic polyisocyanates such as 4,4'-dicyclohexylmethane diisocyanate, and the dimethyl derivatives thereof. Further examples of suitable polyisocyanates are trimethyl hexamethylene diisocyanate, lysine diisocyanate methyl ester (LDIM), alicyclic polyisocyanates such as isophorone diisocyanate, methyl cyclohexyl diisocyanate, 1,5-naphthalene diisocyanate, triphenylmethane triisocyanate, xylylene and xylene diisocyanate, and the methyl derivatives thereof, polymethylenepolyphenyl isocyanates, chlorophenylene-2,4-diisocyanate, and the like. Although all polyisocyanates react with the phenolic addition product to form a crosslinked structure, certain polyisocyanates are preferred, depending on the intended end use of the product. For example, where the ultimate composition of this invention is to be unpigmented, slightly pigmented, or pigmented with a light-colored pigment, the polyisocyanate component will be chosen because of its color stability characteristics. Apart from the characteristic of color stability, the preferred polyisocyanate components are normally chosen because of their greater reactivity. Generally speaking, the fastest curing time is obtained when aromatic polyisocyanates are used in this invention. Aliphatic polyisocyanates, while also yielding rapid cure in the presence of a tertiary amine, give somewhat slower cures than the aromatic polyisocyanates.

It has been found that the choice of polyisocyanate affects not only the original color of the coating but also the color after aging under conditions such as ultraviolet light exposure. Among the generally preferred polyisocyanates are a reaction product of hexamethylene diisocyanate and toluene diisocyanate known and available under the trademark Mondur HC (Mondur is a trademark of Mobay Chemical Company); a TDI-TMP adduct known and available under the name Mondur CB–60; aliphatic and aromatic diisocyanate adducts of polycaprolactones, polypropylene glycol ethers, or polyesters derived from polybasic acids and polyhydric alcohols; polymethylenepolyphenyl isocyanates known and available under the name Mondur MR or Mondur MRS; TDI isocyanurate trimer; and the biurets, which are the reaction product of a polyisocyanate with water. One such biuret is known and available under the trademark of Farbenfabriken Bayer A.G. Desmodur N.

Of these polyisocyanate materials, those found to exhibit superior color properties are Mondur HC; polyisocyanates based on xylylene diisocyanate, such as a xylylene diisocyanate-TMP adduct; and Desmodur N.

The polysiocyanate is employed in sufficient concentrations to cause the curing of the phenolic addition product to a tack-free state at room temperature in a relatively short period of time. In general, the polyisocyanate or a polyisocyanate prepolymer will be employed in a range of about 10 to about 500 weight percent of polyisocyanate based on the weight of the phenolic addition product. Preferably, from 20–300 weight percent of polyisocyanate on the same basis is employed. This amount is dependent upon the amount of NCO groups in the polyisocyanate component. The polyisocyanate is employed in liquid form. Liquid polyisocyanates may be employed in undiluted form. Solid or viscous polyisocyanates may be employed in the form of organic solvent solutions, the solvent being present in a range of up to 80% by weight of the solution.

The solvent employed in combination with either the phenolic addition product component or with the polyisocyanate component or with both components does not enter to any significant degree into the reaction. In some cases, the difference in the polarity between the polyisocyanate component and the phenolic addition product component restricts the choice of solvent in which both components are compatible. Such compatibility is necessary to achieve reaction and essentially complete curing of the novel compositions of the present invention. The solvent aids in the uniform distribution of the blend of ingredients on a substrate. Aromatic solvents, although compatible with the polyisocyanates, are less compatible with the phenolic addition product component. It is, therefore, preferred to employ combinations of solvents, and particularly combinations of aromatic and polar solvents. Suitable aromatic solvents are benzene, toluene, xylene, ethylbenzene, naphthalene, and mixtures thereof. The polar solvents should not be extremely polar such as to become incompatible with the aromatic solvent. Suitable solvent which are compatible with aromatic solvents include, in particular, ester, ketone, and ether solvents. These solvents should preferably not contain active hydrogen moieties reactive with the polyisocyanate. Preferred solvents include the esters of glycol ethers, such as ethylene glycol monoethyl ether acetate (known and sold under the trademark of Union Carbide Company of Cellosolve acetate), ethylene glycol monobutyl ether acetate (known and sold under the name butyl Cellosolve acetate); ketone solvents, such as methyl isobutyl ketone and methyl heptyl ketone; butyl and ethyl acetate; and furfural.

It has also been found that the pot life of the blend of the polyisocyanate component and the phenolic addition product component can be significantly improved without adversely affecting the rapid curing and finished film properties of the component blends. Pot life as used herein is defined as the time at which the blend can no longer be applied under normal application conditions. The pot life improvement is attained by the addition of an effective amount of either mineral or strong organic acids or acid halides. Acids which are useful include hydrochloric, phosphoric, trichloroacetic, benzene sulfonic acids, and the like. Phthaloyl chloride is particularly effective as an additive to improve the pot life of these blends. These acids or acid halides are used in concentrations up to 3% based on the non-volatile content of the blend.

When the components described with particularity above are mixed and formed into, for example, a coating film, they can be rapidly and essentially completely cured to a tack-free state at room temperature in the presence of tertiary amines. The tertiary amine is believed to act in a catalytic fashion rather than as a reactant, although this is theory and applicants are not bound thereby. These amines can be in a liquid or gaseous state. If the tertiary amine is in a liquid form, it can be admixed with the phenolic addition product component. The polyisocyanate component can be added to this admixture (1) just prior to application of the phenolic addition product component to the surface or substrate, as in the case of a two-head spray gun application, or (2) simultaneous with the application of the phenolic addition product component to a surface or substrate, as in a roller coating application. Essentially complete curing occurs very rapidly at room temperature. When the tertiary amine is in a gaseous form or atomized in an inert carrier gas, an admixture of the phenolic addition product component and the polyisocyanate in the form of a film can be rapidly cured simply by exposure of the film surface to the tertiary amine atmosphere. Suitable tertiary amines are gaseous tertiary amines such as trimethyl amine. However, normally liquid trialkyl amines having up to about 12 carbons such as triethyl amine, ethyl dimethyl amine, and methyl diethyl amine are equally suitable. Preferred tertiary amines are those having a high vapor pressure at room temperature or what might be called low boiling tertiary amines such as triethyl amine. Although ammonia, primary amines and secondary amines exhibit some activity in causing a room temperature reaction, they are considerably inferior to the tertiary amines as are functionally substituted amines, particularly those containing an active hydrogen, because they react with the polyisocyanate component.

The use of phenol addition compounds with polyisocyanates according to this invention enables the production of cured compositions having a wide range of flexibility characteristics. One of the important disadvantages of the conventional phenolic material cured in the presence of a polyisocyanate is its patent inflexibility.

A distinct advantage of the present invention over the prior art, in addition to advantage of very rapid curing at room temperature, is the fact that the compositions of this invention can be mixed, while in their liquid state, with the tertiary amine in liquid form for totally liquid application as was briefly mentioned in the discussion of the two-head spray gun application previously. Once applied in liquid form, the compositions readily cure at room temperature to essentially their ultimate state for use. The compositions of the prior art, as exemplified in U.S. Pat. 3,409,579, cannot be so applied because of their almost instantaneous gelation upon contact with the tertiary amine. The compositions of this invention, while they cure very rapidly relative to the prior art systems, cure slow enough to allow premixing of the liquid tertiary amine with one of the two remaining components and good sprayability as a two-component system through a two-head spray gun. The slight delay in curing allows the entire composition to flow together smoothly on the surface to be sprayed and then readily cure to its ultimate state at room temperature. For these same reasons, brushing and roller coating applications are possible.

This invention makes it possible to combine the disclosed components with pigments for use as rapid cure fillers for paneling materials such as chipboard. The fillers can be formulated by mixing a filler pigment, such as $CaCO_3$, with the phenolic addition product component in a ratio of from 6:1 to 0.1. These ingredients are normally blended with a high speed mixer. These pigmented components are then mixed with the polyisocyanate component and applied as fillers to the panel board. Curing is effected by bringing the above ingredients together with a tertiary amine. This invention also makes it possible to pigment the disclosed compositions in a similar manner with paint pigments, such as $TiO_2$, and thus provide a rapid cure general industrial enamel for a variety of uses as primers and final color coatings for wood, metal, etc. Furthermore, this invention makes it possible to provide for rapid cure filling, as discussed above, followed by rapid cure finishing to a high gloss with an unpigmented composition made according to this invention. Thus, this invention makes possible a number of rapid cure laminations according to the teachings of this invention: filling, printing, and high-gloss overcoating. Such pigmented filler or finishing compositions according to this invention cure rapidly to a handleable state, within the period of from about 30 minutes to about 45 minutes.

These compositions are of low cost since they are the reaction products of phenol addition products and polyisocyanates. The phenol addition products are prepared from phenol and low cost vegetable oils or butadiene polymers. They do not provide completely non-yellowing coatings but rather inexpensive flexible coatings for use as primers, paper coatings, and other primary applications where adhesion is of the utmost importance.

It is contemplated that the novel compositions and process of the instant invention, generally, will be useful as rapid cure printing inks; for finishing bowling alleys, bowling pins, sports equipment, furniture, insulation, cabinets, and paper boxes; as chemical resistant coatings for concrete and jet fuel tanks; as floor and aircraft enamels; as marine paints, as tank linings; as binders for foundry cores; nd in the production of factory finish wood products. These potential uses are by no means intended to be exclusive of other uses. Other applications of this invention will become readily apparent to one of ordinary skill in the art.

EXAMPLES

The following examples are for purposes of illustration only and are in no way intended to limit the scope of the invention. All compositions are shown in parts by weight.

Example I

| Charge: | Parts |
|---|---|
| Toluene | 166.0 |
| Phenol | 356.6 |
| $AlCl_3$ (Anhy.) | 33.6 |
| Tung Oil | 277.8 |
| Toluene | 166.0 |
| | 1,000.0 |

Procedure.—A reaction flask is set up equipped with a thermometer, stirrer, dropping funnel, heating unit, and condenser.

Charge the first portion of toluene, phenol, and $AlCl_3$ to a reaction flask and heat to 100° C. with agitation.

Mix the tung oil and second portion of toluene in a dropping funnel.

Add the contents of the funnel to the reaction flask at a rate that maintains reaction temperature at 100–105° C. Addition time is about 15 minutes.

Continue reaction at 100–105° C. for another 2½ hours.

Cool the reactor to 90° C., add 950 parts of hot tap water, and mix at 80–90° C. for 10–15 minutes.

Add 63 mls. of acetic acid, pour into a separatory funnel, and let stand to separate.

Discard water layer and repeat washing of oil layer two more times omitting the acetic acid from these washes.

Pour oil layer from final washing back into the reactor and heat to 150° C. to remove most of the toluene and water.

Gradually apply vacuum to remove remaining volatiles.

Increase temperature to 160° C. under about 1 mm. Hg, hold until distillate stops, and cool product to room temperature. Product is a viscous, clear, dark colored material.

Example II

| | Parts |
|---|---|
| Product of Example I | 293.0 |
| Mondour CB-60 | 491.0 |
| Cellosolve Acetate-Urethane Grade | 216.0 |
| | 1,000.0 |

Theoretical NCO/Phenolic OH ___ 1.6.
Percent Non-Volatile ___ 50.
Gel Time ___ More than 6 weeks.

A 1.5 mil wet film of this blend was deposited on a glass panel. The film was exposed to a saturated triethyl amine (TEA) atmosphere for 15 seconds. Thirty seconds after removal from the TEA atmosphere, the film passes 500 g. Zapon showing a tack-free state. One hour after exposure, the film has a Sward hardness of 30. Twenty-four hours after exposure, the film has the following properties:

Sward Hardness _____ 52.
Flexibility _____ Very good (knife scratch).
Mar Resistance _____ Poor.
Xylene Resistance _____ Excellent (15 minutes spot).

Example III

| Charge: | Parts |
|---|---|
| Bleached and Refrigerated Linseed Oil | 149.7 |
| Pentaerythritol | 32.1 |
| Lead Oxide | 0.24 |
| Phthalic Anhydride | 58.6 |
| Maleic Anhydride | 0.23 |
| Xylene | 5.8 |
|  | 246.67 |
| Water of Esterification | 6.6 |
|  | 240.07 |
| Toluene | 228.4 |
| Phenol | 260.6 |
| Toluene | 260.6 |
| BF$_3$ Etherate | 10.19 |
|  | 999.86 |

Procedure.—Charge the linseed oil, pentaerythritol and lead oxide to a reaction flask and heat to 245° C. maximum under a nitrogen blanket to alcoholize the oil.

Hold at alcoholysis temperature (i.e. 245° C.) until a mixture of 1 part of the reaction mixture and 2 parts methanol gives a clear solution.

Cool the reactor to 150° C. and add the phthalic, maleic, and xylene reflux solvent.

Reheat to about 195° C. where azeotropic distillation of the water of esterification begins.

Continue esterification to an acid value of 5 to 6. Reaction temperature preferably should not exceed about 255° C.

Cool to about 175° C., add the 228.4 parts of toluene and transfer to a dropping funnel.

Charge the phenol, 260.6 parts toluene and BF$_3$ to another reactor and heat to 100° C. under a nitrogen blanket.

Add the contents of the dropping funnel to the reactor at a rate that maintains reaction temperature at 100–105° C. Addition time is about 15 minutes.

Continue reaction at 100–105° C. for another 2½ hours.

Cool the reactor to 90° C., add 1,000 parts of hot tap water and mix for 10–15 minutes at 80° C.

Transfer the mixture to a separatory funnel, let stand to separate and return organic portion of the reaction flask. Discard aqueous portion.

Repeat washing 2 more times.

Pour organic layer from final washing back into the reactor and heat to 150° C. to remove most of the toluene and water.

Gradually apply vacuum to remove remaining volatiles.

Increase temperature to 180° C. under about 1 mm. Hg, hold until distillate stops, and cool product to room temperature. Product is a very viscous, clear, dark colored material.

Example IV

|  | Parts |
|---|---|
| Product of Example III | 347.0 |
| Mondur CB-60 | 429.0 |
| Cellosolve Acetate-Urethane Grade | 224.0 |
|  | 1,000.0 |
| Theoretical NCO/Phenolic OH | 1.6 |
| Percent Non-volatile | 50. |
| Gel Time | 11 days. |

A 1.5 mil wet film of this blend was deposited on a glass panel. The film was exposed to a saturated triethyl amine atmosphere for 15 seconds. Thirty seconds after removing from the TEA atmosphere, the film passed 500 g. Zapon indicating a tack-free state. One hour after exposure, the film has a Sward hardness of 28. Twenty-four hours after exposure, the film has the following properties:

Sward Hardness _____ 70.
Flexibility _____ Good (knife scratch).
Mar Resistance _____ Poor.
Xylene Resistance _____ Excellent (15 minute spot).

Having now described the invention, many ramifications and modified embodiments will readily occur to those skilled in the art. Insofar as such variations do not depart from the spirit and scope of the invention described in this application, they are intended to be embraced by the appended claims in their broadest construction.

What is claimed is:

1. A composition rapidly cured to a tack-free state at room temperature with a tertiary amine comprising an admixture of (I) a member selected from the group consisting of an organic polyisocyanate of 2 through 5 isocyanates groups, a polyisocyanurate, and prepolymer formed therefrom, (II) a phenolic addition product formed by reaction of a phenolic having up to 15 carbon atoms therein and an unsaturated compound selected from the group consisting of: (1) the unsaturated aliphatic acids having from about 12 to about 22 carbon atoms; (2) natural oils which are glycerol esters of the acids contemplated by (1); (3) synthetic esters of the acids contemplated by (1) with monohydric and polyhydric alcohols of about 1 to 22 carbon atoms; (4) homopolymers of butadienes; and (5) copolymers of butadiene and its homologues with vinyl unsaturated monomeric materials; (6) synthetic esters of unsaturated aliphatic alcohols of about 1 to 22 carbon atoms with monobasic and polybasic acids of about 1 to 36 carbon atoms and (III) said tertiary amine catalyst.

2. A composition according to Claim 1 wherein the phenolic is of the following general formula:

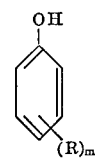

wherein R can be H, a $C_1$–$C_9$ aliphatic substituent saturated or unsaturated, branched or unbranched, or an aromatic substituent of which 6 carbon atoms are in the ring, $m$ is an integer of from 1 through 4.

3. A composition according to Claim 2 wherein $m$ is 1 or 2 and said tertiary amine catalyst is triethylamine.

4. A composition according to Claim 3 wherein the unsaturated compound is a homopolymer or copolymer of butadiene.

5. A composition according to Claim 4 wherein the polyisocyanate has 2 or 3 isocyanate groups therein.

6. A composition according to Claim 5 wherein the phenolic is the preferred phenolic, phenol.

7. A composition according to Claim 3 wherein the unsaturated compound is a neutral oil or alkyd polymer thereof.

8. A composition according to Claim 5 wherein the polyisocyanate is present in about 10 to 500% by weight of the phenolic addition product.

9. A composition according to Claim 8 which is curable with a trialkylamine having a total of up to about 12 carbon atoms therein.

10. A process of preparing a composition which is rapidly cured to a tack-free state at room temperature comprising mixing (I) a member selected from the group consisting of an organic polyisocyanate of 2 through 5 isocyanate groups, a polyisocyanurate or prepolymer formed therefrom, (II) a phenolic addition product formed by reaction of a phenolic having up to 15 carbon atoms therein and an unsaturated compound selected from the group consisting of: (1) the unsaturated aliphatic acids having from about 12 to about 22 carbon atoms; (2) natural oils which are glycerol esters of the acids contemplated by (1); (3) synthetic esters of the acids contemplated by (1) with monohydric and polyhydric alcohols of about 1 to 22 carbon atoms; (4) homopolymers of butadienes; and (5) copolymers of butadiene and its homologues with vinyl unsaturated monomeric materials; (6) synthetic esters of unsaturated aliphatic alcohols of about 1 to 22 carbon atoms with monobasic and polybasic acids of about 1 to 36 carbon atoms and (III) said tertiary amine catalyst.

11. A process according to Claim 10 where in the phenolic are of the following general formula:

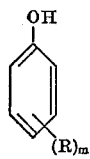

wherein R can be H, a $C_1$–$C_9$ aliphatic substituent saturated or unsaturated, branched or unbranched, or an aromatic substituent of which 6 carbon atoms are in the ring, $m$ is an integer of from 1 through 4.

12. A process according to Claim 11 wherein $m$ is 1 or 2 and said tertiary amine catalyst is triethylamine.

13. A process according to Claim 12 wherein the unsaturated compound is a homopolymer or copolymer of butadiene.

14. A process according to Claim 13 wherein the polyisocyanate has 2 to 3 isocyanate groups therein.

15. A process according to Claim 14 wherein the phenolic is the preferred phenolic, phenol.

16. A process according to Claim 12 wherein the unsaturated compound is a natural oil or alkyd polymer thereof.

17. A process according to Claim 15 wherein the polyisocyanate is present in about 10 to 500% by weight of the phenolic addition product.

18. A process according to Claim 17 which is curable with a trialkylamine having a total of up to about 12 atoms therein.

19. A process according to Claim 12 wherein the composition has been cured by contacting same with an atmosphere containing tertiary amine vapors.

20. A process according to Claim 19 wherein said atmosphere is saturated with tertiary amine vapors.

21. A process according to Claim 20 wherein said atmosphere is saturated with triethylamine vapors.

22. A composition according to Claim 3 wherein the composition has been cured by contacting same with an atmosphere containing tertiary amine vapors.

23. A composition according to Claim 22 wherein said atmosphere is saturated with tertiary amine vapors.

24. A composition according to Claim 23 wherein said atmosphere is saturated with triethylamine vapors.

References Cited

UNITED STATES PATENTS

| | | | |
|---|---|---|---|
| 2,645,623 | 7/1953 | Hermann | 260—47 |
| 2,890,198 | 6/1959 | Breiner | 260—47 |
| 3,523,100 | 8/1970 | Stein et al. | 260—47 |
| 3,516,954 | 6/1970 | Ploog et al. | 260—47 |
| 3,057,614 | 10/1962 | Greenlee | 260—23.7 |
| 3,409,579 | 11/1968 | Robins | 260—30.4 |
| 3,616,193 | 10/1971 | Lubowitz et al. | 260—836 |

MAURICE J. WELSH, JR., Primary Examiner

E. C. RZUCIDLO, Assistant Examiner

U.S. Cl. X.R.

260—22 TN, 23 TN, 47 CB, 75 TN, 77.5 AM, 77.5 CR, 858

UNITED STATES PATENT OFFICE
CERTIFICATE OF CORRECTION

Patent No. 3,822,226     Dated July 2, 1974

Inventor(s)  David D. Taft & Roger A. Schmidt

It is certified that error appears in the above-identified patent and that said Letters Patent are hereby corrected as shown below:

In Column 5, Line 51; "12 carbon atoms" should be corrected to --22 carbon atoms--.

In Column 13, Line 2; "neutral" should be corrected to --natural--.

In Column 14, Line 15; "12 atoms" should be --12 carbon atoms--

Signed and sealed this 19th day of November 1974.

(SEAL)
Attest:

McCOY M. GIBSON JR.
Attesting Officer

C. MARSHALL DANN
Commissioner of Patents